US012674939B2

(12) United States Patent
Konoshita

(10) Patent No.: US 12,674,939 B2
(45) Date of Patent: Jul. 7, 2026

(54) LIGHT GUIDE PLATE

(71) Applicant: Nippon Electric Glass Co., Ltd., Shiga (JP)

(72) Inventor: Satoko Konoshita, Shiga (JP)

(73) Assignee: NIPPON ELECTRIC GLASS CO., LTD., Shiga (JP)

(*) Notice: Subject to any disclaimer, the term of this patent is extended or adjusted under 35 U.S.C. 154(b) by 227 days.

(21) Appl. No.: 18/267,942

(22) PCT Filed: Dec. 14, 2021

(86) PCT No.: PCT/JP2021/046035
§ 371 (c)(1),
(2) Date: Jun. 16, 2023

(87) PCT Pub. No.: WO2022/138326
PCT Pub. Date: Jun. 30, 2022

(65) Prior Publication Data
US 2024/0103226 A1      Mar. 28, 2024

(30) Foreign Application Priority Data

Dec. 21, 2020    (JP) ................................. 2020-210992

(51) Int. Cl.
*G02B 6/34* (2006.01)
*G02B 5/18* (2006.01)
*G02B 27/01* (2006.01)

(52) U.S. Cl.
CPC ............. *G02B 6/34* (2013.01); *G02B 5/1866* (2013.01); *G02B 27/0172* (2013.01)

(58) Field of Classification Search
CPC ........ G02B 6/34; G02B 27/0172; G02B 5/18; G02B 5/1866; G02F 1/29
See application file for complete search history.

(56) References Cited

U.S. PATENT DOCUMENTS 4,729,641 A * 3/1988 Matsuoka ................. G02F 1/29
349/200
2003/0231396 A1* 12/2003 Nakai ................ G02B 27/0056
359/569

(Continued)

FOREIGN PATENT DOCUMENTS

CN        109239842        1/2019
JP        2005-319746        11/2005

(Continued)

OTHER PUBLICATIONS

International Preliminary Report on Patentability and Written Opinion of the International Searching Authority issued Jun. 13, 2023 in International (PCT) Application No. PCT/JP2021/046035.

(Continued)

*Primary Examiner* — Eric Wong

(74) *Attorney, Agent, or Firm* — Wenderoth, Lind & Ponack, L.L.P.

(57) ABSTRACT

Provided is a light guide plate which, when used as a light guide plate of a glasses-type device such as a wearable device for AR/MR, is capable of enhancing color reproducibility of an image. A light guide plate 10 includes a glass plate 1, and a resin layer 2 formed at a main surface of the glass plate 1. The difference in Abbe number vd between the glass plate 1 and the resin layer 2 is less than 10. The refractive indices nd of the glass plate 1 and the resin layer 2 are 1.7 or greater and the difference between the refractive indices nd is 1.0 or less.

9 Claims, 1 Drawing Sheet

(56) References Cited

U.S. PATENT DOCUMENTS

| | | | |
|---|---|---|---|
| 2004/0042102 A1* | 3/2004 | Ukuda | G02B 5/18 359/558 |
| 2013/0235460 A1* | 9/2013 | Iwasa | G02B 5/1876 359/576 |
| 2015/0268391 A1* | 9/2015 | Iwasa | G02B 5/1866 359/576 |
| 2018/0029319 A1* | 2/2018 | Kalima | G02B 5/1857 |
| 2018/0239150 A1 | 8/2018 | Yoshida et al. | |
| 2020/0264434 A1 | 8/2020 | Shin et al. | |
| 2020/0292818 A1* | 9/2020 | Amitai | G02B 27/145 |
| 2022/0365270 A1 | 11/2022 | Someya et al. | |

FOREIGN PATENT DOCUMENTS

| | | |
|---|---|---|
| JP | 2020-8599 | 1/2020 |
| KR | 10-2014-0136145 | 11/2014 |
| WO | 2017/038350 | 3/2017 |
| WO | 2021/172237 | 9/2021 |

OTHER PUBLICATIONS

International Search Report issued Mar. 8, 2022 in corresponding International Application No. PCT/JP2021/046035.

Notice of Reasons for Refusal issued Jun. 26, 2024 in corresponding Japanese Patent Application No. 2020-210992, with English translation.

Office Action issued Mar. 25, 2026 in corresponding Chinese Patent Application No. 202180083957.5, with English translation.

* cited by examiner

LIGHT GUIDE PLATE

TECHNICAL FIELD

The present invention relates to a light guide plate used in a glasses-type device such as a wearable device for augmented reality (AR)/mixed reality (MR).

BACKGROUND ART

In recent years, glasses-type devices such as wearable devices for AR/MR have been developed. These glasses-type devices are see-through type devices with which an image displayed on a light guide plate of a glasses portion can be viewed while viewing the external scene. With such see-through type devices, it is possible to achieve 3D display by displaying different images on light guide plates corresponding to the left and right pupils of a user, or directly project an image onto a retina of the user by utilizing the crystalline lenses of the pupils to form an image with the retina.

Methods of displaying an image by using a light guide plate include a method in which a diffraction grating formed at an incident side surface of a light guide plate is used to cause collimated light or laser light emitted from an image display element to be incident into the light guide plate, the incident light is guided while being totally reflected inside the light guide plate, and the light is extracted to the outside through a diffraction grating formed at an emission side surface and caused to be incident on a pupil of a user. For the light guide plate, there has been proposed a light guide plate in which a surface of a glass plate having a high refractive index and excellent rigidity is coated with resin, and then a high-resolution diffraction grating is formed by a nanoimprint technique (see, for example, Patent Document 1).

CITATION LIST

Patent Literature

Patent Document 1: JP 2020-8599 A

SUMMARY OF INVENTION

Technical Problem

When a light guide plate made of a glass plate coated with resin is used in a glasses-type device such as a wearable device for AR/MR, it may not be possible to project an image with good color reproducibility.

In view of the above, it is an object of the present invention to provide a light guide plate which, when used as a light guide plate of a glasses-type device such as a wearable device for AR/MR, is capable of enhancing color reproducibility of an image.

Solution to Problem

The light guide plate according to the present invention includes a glass plate, and a resin layer formed at a main surface of the glass plate. The difference in Abbe number vd between the glass plate and the resin layer is less than 10. The refractive indices nd of the glass plate and the resin layer are 1.7 or greater and the difference between the refractive indices nd is 1.0 or less.

The light guide plate according to the present invention includes a glass plate and a resin layer, which each have a refractive index corresponding to the respective material. Here, when the difference in refractive index between the glass plate and the resin layer is small, it is possible to suppress light scattering at the interface between the glass plate and the resin layer. However, the refractive index of each material is dependent on the wavelength, and thus the difference in refractive index may vary depending on the wavelength. For example, even if the difference in refractive index between the glass plate and the resin layer is small and light scattering at the interface between the glass plate and the resin layer can be suppressed at a certain wavelength, the difference in refractive index between the glass plate and the resin layer may be large and light scattering at the interface between the glass plate and the resin layer may increase at another wavelength. Therefore, the present inventor focused on the Abbe number vd, which is an indicator of wavelength dependence of the refractive index, and found that the above-described problem can be solved by reducing the difference in Abbe number vd between the glass plate and the resin layer as described above. Specifically, when the difference in Abbe number vd between the glass plate and the resin layer is reduced, the difference in slope between curves indicating the wavelength dependence of the refractive indices of the glass plate and the resin layer is reduced, so that variation in the difference between the refractive indices at each wavelength is reduced. As a result, it is possible to suppress light scattering at the interface between the glass plate and the resin layer at each wavelength. Therefore, color reproducibility of an image can be enhanced.

In addition, in the light guide plate according to the present invention, the difference in refractive index nd between the glass plate and the resin layer is 1.0 or less, and thus the difference in refractive index between the glass plate and the resin layer is small, and light scattering loss at the interface between the glass plate and the resin layer is less likely to occur.

In the light guide plate according to the present invention, the glass plate preferably has a thickness of from 0.1 mm to 1 mm and the resin layer preferably has a thickness of 1 μm or less. The intensity of light incident on the light guide plate decreases mainly due to a loss from light scattering caused by difference in refractive index at the interface between the glass plate and the resin layer, and a loss from absorption inside the glass plate and the resin layer. When the thickness of the glass plate or the resin layer is small, the absorption loss inside the glass plate or the resin layer is reduced, and the influence of the light scattering loss at the interface between the glass plate and the resin layer tends to be relatively large. Thus, when the thickness of the glass plate or the resin layer is small as described above, the effect of the present invention is easily achieved.

The light guide plate according to the present invention preferably has an internal transmittance of 70% or greater at a wavelength of from 450 nm to 650 nm when the glass plate has a thickness of 10 mm. In this way, the absorption loss when light is guided inside the glass plate is reduced, and the intensity of emitted light can be increased.

In the light guide plate of the present invention, it is preferable that the difference between external transmittances at wavelengths of 450 nm and 650 nm is 5% or less. In this way, variation in intensity of the light emitted from the light guide plate, the variation being dependent on the wavelength, is reduced, and color reproducibility of the image is easily improved.

In the light guide plate according to the present invention, the main surfaces of the glass plate preferably have a surface roughness Ra of 5 nm or less. In this way, when light is reflected and guided between the main surfaces of the glass plate, it is possible to suppress light scattering loss at the main surfaces of the glass plate, and the intensity of emitted light can be increased.

In the light guide plate according to the present invention, an uneven structure is preferably formed at a surface of the resin layer. In this way, the resin layer functions as a diffraction grating, and can cause light from the outside to be incident into the glass plate and light inside the glass plate to be emitted to the outside.

In the light guide plate according to the present invention, the resin layer is preferably made of a photocurable resin. In this way, it is possible to easily obtain an uneven structure having a shape of the order of nanometers.

A wearable device for AR/MR according to the present invention includes any of the light guide plates described above.

Advantageous Effects of Invention

According to the present invention, it is possible to provide a light guide plate which, when used as a light guide plate of a glasses-type device such as a wearable device for AR/MR, is capable of enhancing color reproducibility of an image.

DESCRIPTION OF EMBODIMENTS

Figures 1, 2:
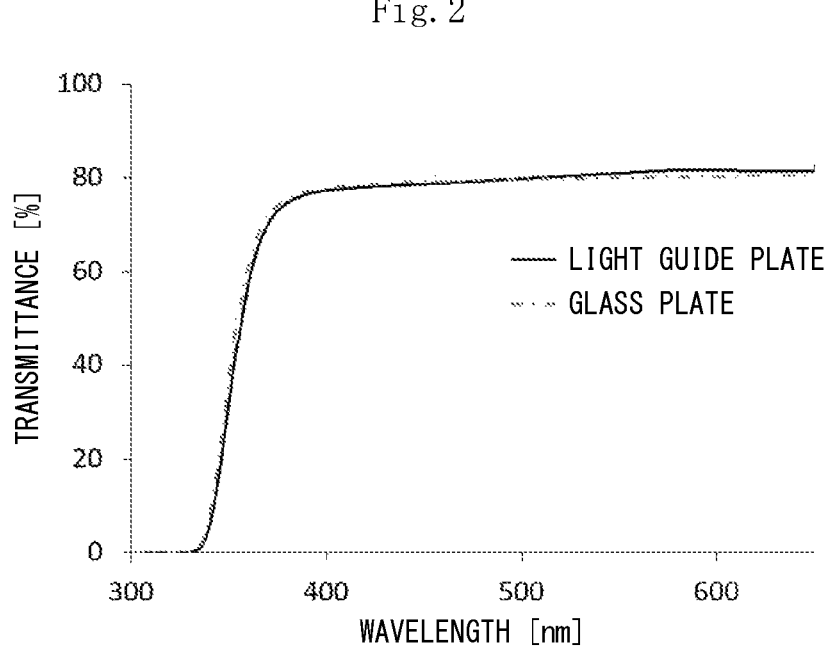
FIG. 1 is a schematic cross-sectional view illustrating an embodiment of a light guide plate according to the present invention.
FIG. 2 is a graph showing transmittance curves of a light guide plate and a glass plate according to Example 2.

An embodiment of a light guide plate according to the present invention will be described below with reference to the drawings.

FIG. 1 is a schematic cross-sectional view illustrating an embodiment of the light guide plate according to the present invention. A light guide plate 10 includes a glass plate 1 and a resin layer 2. The resin layer 2 includes resin layers 2a and 2b, each of which is formed at one main surface of the glass plate 1. Specifically, the resin layer 2a is formed at a surface of a light incident portion of the glass plate 1, and the resin layer 2b is formed at a surface of a light emission portion of the glass plate 1. An uneven structure is formed at a surface of the resin layers 2a and 2b, and thus the resin layers 2a and 2b function as diffraction gratings.

Light emitted from an image display element (not illustrated) is incident on the light guide plate 10 as incident light $L_1$. The incident light $L_1$ is diffracted by the resin layer 2a and is incident into the glass plate 1. The incident light $L_1$ is guided inside the glass plate 1 to the light emission portion while being totally reflected between the two main surfaces of the glass plate 1. The incident light $L_1$ is diffracted by the resin layer 2b formed at the light emission portion, is emitted to the outside of the glass plate 1 as emitted light $L_2$, and is incident on a pupil of a person. In this way, an image projected from the image display element can be viewed. The light guide plate 10 is transparent and of a see-through type, so that the external scene can also be simultaneously viewed through the light guide plate 10. Note that the incident light $L_1$ and the emitted light $L_2$ are visible light, and are light having a wavelength range of from 400 nm to 800 nm, for example.

Glass Plate 1

The glass plate 1 has a refractive index (nd) of 1.7 or greater, preferably 1.8 or greater, 1.9 or greater, 1.95 or greater, and particularly preferably 1.98 or greater. On the other hand, the upper limit of the refractive index of the glass plate 1 is preferably 2.1 or less, 2.05 or less, 2.03 or less, and particularly preferably 2.01 or less. If the refractive index of the glass plate 1 is too low, the viewing angle (FOV) tends to be narrow when the glass plate 1 is used in a light guide plate of a wearable device for AR/MR or the like. On the other hand, if the refractive index is too high, defects such as devitrification and striae occur and the internal transmittance is likely to decrease.

The Abbe number of the glass plate 1 is not particularly limited. However, resin having a refractive index of 1.7 or greater often has an Abbe number of 30 or less. Thus, from the viewpoint of reducing the difference in Abbe number from the resin layer 2, the lower limit of the Abbe number of the glass plate 1 is preferably 20 or greater, 22 or greater, and particularly preferably 25 or greater, and the upper limit thereof is preferably 30 or less and particularly preferably 28 or less.

The thickness of the glass plate 1 is preferably 0.1 mm or greater, 0.15 mm or greater, and particularly preferably 0.2 mm or greater, and is preferably 1 mm or less, 0.5 mm or less, 0.4 mm or less, and particularly preferably 0.3 mm or less. If the thickness of the glass plate 1 is too small, the mechanical strength is likely to decrease. On the other hand, if the thickness of the glass plate 1 is too large, the weight of the wearable device that uses the glass plate 1 increases, which tends to increase a sense of discomfort experienced by a user wearing the device.

The long diameter (a diagonal line in the case of a rectangle) of the main surfaces of the glass plate 1 preferably has a length of 100 mm or less, 80 mm or less, and particularly preferably 50 mm or less. In this way, it is possible to reduce the size of the wearable device. The lower limit of the length is not particularly limited, but is realistically 10 mm or greater, and particularly 300 mm or greater.

Note that the more compact (the smaller in thickness or long diameter) the glass plate 1, the shorter the optical path length when light is guided inside the glass plate 1 and the smaller the internal absorption loss, and the influence of the light scattering loss at the interface between the glass plate 1 and the resin layer 2 tends to be relatively large. Thus, when the thickness of the glass plate 1 is small as described above, the effect of the present invention is easily achieved.

When the thickness of the glass plate 1 is 10 mm, the glass plate 1 preferably has an internal transmittance of 70% or greater, 80% or greater, 90% or greater, and particularly preferably 95% or greater at a wavelength of from 450 nm to 650 nm. In this way, it is possible to suppress absorption loss when light is guided inside the glass plate 1, and increase the intensity of emitted light.

A first main surface 1a and a second main surface 1b of the glass plate 1 preferably have a surface roughness Ra of 5 nm or less, 3 nm or less, and particularly preferably 2 nm or less. If the surface roughness Ra of the first main surface 1a and the second main surface 1b of the glass plate 1 is too large, scattering loss is likely to occur when light incident into the glass plate 1 is guided while being repeatedly totally reflected, and it is difficult to obtain a bright and sharp image. The lower limit of the surface roughness Ra of the first main surface $1a$ and the second main surface $1b$ of the glass plate 1 is not particularly limited, but is realistically 0.1 nm or greater.

The difference between the maximum value and the minimum value of the distance between the first main surface $1a$ and the second main surface $1b$ (total thickness variation (TTV)) of the glass plate 1 is preferably 5 μm or less, 3 μm or less, and particularly preferably 1 μm or less. If the TTV is too large, it is difficult to accurately guide within the glass plate 1 light of each wavelength incident into the glass plate 1, and the sharpness of the obtained image is likely to decrease.

For the glass composition, the glass plate 1 preferably contains $SiO_2$ or $B_2O_3$, which are components that improves the stability of vitrification, and $La_2O_3$ or $Nb_2O_5$, which are components that increases the refractive index. If these components are contained, glass having a high refractive index and excellent mass productivity is easily obtained.

Preferred ranges of each component are described below. Note that in the description below, "%" means "mass %" unless otherwise indicated.

$SiO_2$ is a component that is effective for vitrification but greatly decreases the refractive index. Thus, the content of $SiO_2$ is preferably from 1% to 45%, and particularly preferably from 3% to 35%.

$B_2O_3$ is a component that is effective for vitrification but increases the Abbe number. Therefore, if the content of $B_2O_3$ is too high, it is difficult to obtain a desired Abbe number (for example, 30 or less). Thus, the content of $B_2O_3$ is preferably 10% or less, and particularly preferably 9.5% or less. The lower limit of the $B_2O_3$ content is not particularly limited, but is preferably 1% or greater, and particularly preferably 2% or greater to increase the stability of vitrification.

Note that the content of $SiO_2+B_2O_3$ is preferably from 1% to 55%, and particularly preferably from 5% to 40%. Note that "x+y+ . . . " as used herein refers to a total amount of the components.

$La_2O_3$ is a component that significantly increases the refractive index and improves the stability of vitrification. The content of $La_2O_3$ is preferably from 0% to 60%, from 10% to 55%, from 20% to 52%, and particularly preferably from 30% to 50%. When the content of $La_2O_3$ is too high, devitrification resistance decreases and mass productivity tends to deteriorate.

$Nb_2O_5$ is a component that significantly increases the refractive index. Furthermore, $Nb_2O$ has an effect of decreasing the Abbe number. The content of $Nb_2O_5$ is preferably from 0% to 40%, from 3% to 40%, and particularly preferably from 5% to 39%.

Note that the content of $La_2O_3+Nb_2O_5$ is preferably from 20% to 70%, and particularly preferably from 30% to 65%.

In addition to $La_2O_3$ and $Nb_2O_5$, $Gd_2O_3$, $Y_2O_3$, or $Yb_2O_3$ may be contained as a component for increasing the refractive index.

As with $La_2O_3$, the content of $Gd_2O_3$ in the glass may be high, but if the content is too high, the density of the glass increases. Furthermore, devitrification also easily occurs. Thus, the content of $Gd_2O_3$ is preferably from 0% to 20%, and particularly preferably from 1% to 10%.

The content of $Y_2O_3$ and the content of $Yb_2O_3$ are each preferably from 0% to 10%, and particularly preferably from 0.1% to 8%. When the contents of these components are too high, devitrification easily occurs.

If the content of $La_2O_3$ (Ln being at least one selected from the group consisting of La, Gd, Y, and Yb) is increased, a desired high refractive index (for example, 1.7 or greater, 1.8 or greater, or even 1.9 or greater) is easily achieved.

However, if the content of $La_2O_3$ is too high, devitrification easily occurs. Thus, the content of $La_2O_3$ is preferably from 40% to 65%, from 45% to 63%, and particularly preferably from 48% to 60%.

In addition to the components mentioned above, $TiO_2$ or $ZrO_2$, which contribute to improvement in refractive index, is preferably contained.

$TiO_2$ is a component that increases the refractive index and decreases the Abbe number. The content of $TiO_2$ is preferably from 5% to 40%, and particularly preferably from 10% to 30%. When the content of $TiO_2$ is too low, the effects described above are difficult to achieve. On the other hand, if the content of $TiO_2$ is too high, the transmittance decreases, and the stability of vitrification deteriorates.

$ZrO_2$ is also a component that increases the refractive index and decreases the Abbe number. The content of $ZrO_2$ is preferably from 1% to 10%, and particularly preferably from 3% to 8%. If the content of $ZrO_2$ is too low, the effects described above are difficult to achieve. On the other hand, if the content of $ZrO_2$ is too high, the transmittance decreases and the stability of vitrification deteriorates.

In addition, with the aim of improving the stability of vitrification, an alkali metal component ($Li_2O$, $Na_2O$, or $K_2O$), an alkaline earth metal component (MgO, CaO, SrO, or BaO), or ZnO may be contained in a total amount of from 0% to 30%. Note that the alkali metal component may be contained with the aim of adjusting the refractive index and the Abbe number. Specifically, the alkali metal component tends to decrease the refractive index and the Abbe number. The content of the alkali component is preferably from 0% to 20%.

$Sb_2O_3$ may be contained in a range of 0.1% or less with the aim of improving the clarity and the transmittance.

Since As components (such as $As_2O_3$), Pb components (such as PbO), and fluorine components (such as $F_2$) are harmful to the environment, it is preferable that these components are substantially not contained. $Bi_2O_3$ and $TeO_2$ are coloring components and tend to decrease the transmittance in the visible region, and thus it is preferable that these components are substantially not contained. Here, "substantially not contained" means that the component is not intentionally contained as a raw material, and does not exclude cases of unavoidable contamination by impurities. Objectively, this means that the content of each component mentioned above is less than 0.1%.

A plurality of the glass plates 1 may be layered and used as a layered body. In this way, when the glass plate 1 is used as a light guide plate of a wearable device, images can be projected while being overlapped in a depth direction of a display screen, and thus it is possible to obtain a 3D image. The number of layered layers is preferably three or greater, and particularly preferably six or greater.

Resin Layer 2

The resin layer 2 has a refractive index (nd) of 1.7 or greater, preferably 1.8 or greater, 1.9 or greater, 1.95 or greater, and particularly preferably 1.98 or greater. On the other hand, the upper limit of the refractive index of the resin layer 2 is preferably 2.1 or less, 2.05 or less, 2.03 or less, and particularly preferably 2.01 or less. In this way, the difference in refractive index between the glass plate 1 and the resin layer 2 is reduced, and light scattering loss at the interface between the glass plate 1 and the resin layer 2 is less likely to occur.

The difference in refractive index (nd) between the glass plate 1 and the resin layer 2 is 1.0 or less, preferably 0.5 or less, 0.3 or less, 0.2 or less, and particularly preferably 0.15 or less. In this way, the difference in refractive index between the glass plate 1 and the resin layer 2 is reduced, and light scattering loss at the interface between the glass plate 1 and the resin layer 2 is less likely to occur.

For example, the lower limit of the Abbe number of the resin layer 2 is preferably 10 or greater, 15 or greater, 20 or greater, and particularly preferably 25 or greater, and the upper limit thereof is preferably 45 or less, 40 or less, 35 or less, and particularly preferably 30 or less, in consideration of the difference in Abbe number from the glass plate 1.

The difference in Abbe number (νd) between the glass plate 1 and the resin layer 2 is less than 10, preferably 8 or less, 5 or less, and particularly preferably 3 or less. In this way, for the above-described reasons, light scattering at the interface between the glass plate 1 and the resin layer 2 can be suppressed at each wavelength, and it is possible to enhance color reproducibility of an image.

Note that examples of indicators of color reproducibility of an image include the difference between the external transmittances (transmittances including reflection loss) at wavelengths of 450 nm and 650 nm of the light guide plate 10, which is a layered body including the glass plate 1 and the resin layer 2. The difference between the external transmittances at the wavelengths of 450 nm and 650 nm of the light guide plate 10 is preferably 5% or less, 4% or less, 3% or less, and particularly preferably 2.5% or less. In this way, variation in intensity of the light emitted from the light guide plate 10, the variation being dependent on the wavelength, is reduced, and color reproducibility of the image is easily improved.

The resin layer 2 preferably has a thickness of 5 μm or less, 1 μm or less, and particularly preferably 0.5 μm or less. If the thickness of the resin layer 2 is too large, the light absorption increases, and the intensity of light emitted from the light guide plate 10 is likely to decrease. The lower limit of the thickness of the resin layer 2 is not particularly limited, but is preferably 0.01 μm or greater and particularly preferably 0.1 μm or greater to form a desired uneven structure at the surface of the resin layer 2. Note that the smaller the thickness of the resin layer 2, the smaller the absorption loss inside the resin layer 2, and the influence of the light scattering loss at the interface between the glass plate 1 and the resin layer 2 tends to be relatively large. Thus, when the thickness of the resin layer 2 is small as described above, the effect of the present invention is easily achieved.

If an uneven structure is formed at the surface of the resin layer 2, a height of the uneven structure may be appropriately set to obtain a desired diffraction performance. For example, the height of the uneven structure may be from 0.01 to 0.2 μm, and even from 0.03 to 0.1 m.

The resin layer 2 is preferably a photocurable resin. In this way, it is possible to easily obtain an uneven structure having a shape of the order of nanometers.

EXAMPLES

Hereinafter, the present invention will be described based on Examples, but the present invention is not limited to the Examples.

Table 1 shows Examples (No. 1 to 3) of the present invention and a Comparative Example (No. 4). Table 2 shows compositions of glass plates used in the Examples and the Comparative Example.

TABLE 1

| | | No. 1 | No. 2 | No. 3 | No. 4 |
|---|---|---|---|---|---|
| Glass plate | Refractive index nd | 1.82 | 1.99 | 1.82 | 1.82 |
| | Abbe number νd | 25 | 28 | 25 | 25 |
| | Surface roughness Ra [nm] | 1 | 0.3 | 1 | 0.3 |
| | Internal transmittance [%] | 97 | 98 | 97 | 97 |
| | Thickness [mm] | 0.3 | 0.3 | 0.3 | 0.3 |
| Resin layer | Refractive index nd | 1.73 | 2.10 | 1.73 | 1.71 |
| | Abbe number νd | 33 | 29 | 24 | 36 |
| | Internal transmittance [%] | 99 | 99 | 99 | 99 |
| | Thickness [μm] | 0.5 | 0.5 | 0.5 | 0.5 |
| Difference in refractive index between glass plate and resin layer | | 0.09 | 0.11 | 0.09 | 0.11 |
| Difference in Abbe number between glass plate and resin layer | | 8 | 1 | 1 | 11 |
| Difference between transmittances at wavelengths of 650 nm and 450 nm of light guide plate [%] | | 2 | 2 | 2 | 7 |

TABLE 2

| mass % | Nos. 1, 3, 4 | No. 2 |
|---|---|---|
| $SiO_2$ | 32 | 6 |
| $B_2O_3$ | | 9 |
| SrO | | 1 |
| $Li_2O$ | 2 | |
| $Na_2O$ | 11 | |
| $TiO_2$ | 14 | 14 |
| $ZrO_2$ | 5 | 6 |
| $Nb_2O_5$ | 36 | 7 |
| $La_2O_3$ | | 44 |
| $Gd_2O_3$ | | 8 |
| $Y_2O_3$ | | 5 |
| $Sb_2O_3$ | 0.08 | |

In the present Example, differences between external transmittances corresponding to wavelengths were evaluated for light guide plates in which a resin layer is formed at a surface of a glass plate and that have the characteristics and compositions shown in Tables 1 and 2. Specifically, the difference between the external transmittances at the wavelengths of 450 nm and 650 nm of the light guide plate was measured. Raw materials were prepared to obtain the composition shown in Table 2. The raw materials were melted and cast at 1250° C. to 1400° C. using a platinum crucible in the atmosphere to obtain a glass molded body. After that, the glass molded body was cut and polished to produce the glass plates. A resin having a refractive index of from 1.71 to 2.10, an Abbe number of from 24 to 36, and an internal transmittance of 99% was used as the resin constituting the resin layer. Note that FIG. 2 shows a curve of the external transmittance of a light guide plate according to Example 2. For reference, FIG. 2 also shows a curve of the external transmittance of a glass plate used in Example 2.

The surface roughness Ra of the glass plate was measured by using an AFM Dimension Icon available from Bruker Corporation at a scan size of 10 μm and a scan speed of 1 Hz.

The refractive index of the glass plate was measured as follows. Glass plates having a thickness of 0.3 mm were cut at a right angle or polished at a right angle. The cut surface or the polished surface was mirror-polished using a #1000 polishing paper. Subsequently, two of the glass plates were bonded to each other using a refractive index-adjusting immersion liquid (Kalnew) having a refractive index of 1.78. The measurement was performed by using a KPR-2000 available from Shimadzu Corporation. The Abbe number was calculated from the refractive indices obtained at each wavelength of the d-line, the C-line, and the F-line.

The internal transmittance of the glass plate was measured as follows. From the glass molded body produced by the above-described method, glass plates having a size of 10×10 mm or greater and having a thickness of 10 mm and glass plates having a size of 10×10 mm or greater and having a thickness of 3 mm were produced. These glass plates were mirror-polished using a #1000 polishing paper or cerium-polishing powder. For these glass plates, the internal transmittance not including the reflection loss was determined from the transmittance obtained in a measurement using a UV-3100 available from Shimadzu Corporation.

The refractive index of the resin was measured by using an ellipsometer FE-5000 available from Otsuka Electronics Co., Ltd. The Abbe number was calculated from the refractive indices obtained at each wavelength of the d-line, the C-line, and the F-line.

The transmittance of the light guide plate in which the resin layer is formed at the surface of the glass plate was measured by using a UV-3100 available from Shimadzu Corporation.

As shown in Table 1, in the light guide plates Nos. 1 to 3 corresponding to the Examples, the difference in Abbe number between the glass plate and the resin layer was as small as 8 or less, and the difference between the transmittances at the wavelengths of 450 nm and 650 nm was as small as 2%. Therefore, it is considered that color reproducibility is high when the light guide plate is used as a light guide plate in a wearable device for AR/MR. On the other hand, in the light guide plate No. 4 corresponding to the Comparative Example, the difference in Abbe number between the glass plate and the resin layer was as large as 11, and the difference between the transmittances at the wavelengths of 450 nm and 650 nm was as large as 7%. Therefore, it is considered that color reproducibility is poor when the light guide plate is used as a light guide plate in a wearable device for AR/MR.

The invention claimed is:

1. A light guide plate comprising:
a glass plate; and
a resin layer formed at a main surface of the glass plate, wherein
a difference in Abbe number vd between the glass plate and the resin layer is less than 10,
refractive indices nd of the glass plate and the resin layer are 1.7 or greater and a difference between the refractive indices nd is 1.0 or less,
the main surface of the glass plate has a surface roughness Ra of 5 nm or less, and
the glass plate comprises as a glass composition, in terms of mass %, 1% to 45% of $SiO_2$, 0% to 10% of $B_2O_3$, 0% to 60% of $La_2O_3$, 0% to 40% of $Nb_2O_3$, 0% to 20% of $Gd_2O_3$, 0% to 10% of $Y_2O_3$, 5% to 40% of $TiO_2$, and 1% to 10% of $ZrO_2$.

2. The light guide plate according to claim 1, wherein the glass plate has a thickness of from 0.1 mm to 1 mm and the resin layer has a thickness of 1 μm or less.

3. The light guide plate according to claim 1, wherein the light guide plate has an internal transmittance of 70% or greater at a wavelength of from 450 nm to 650 nm when the glass plate has a thickness of 10 mm.

4. The light guide plate according to claim 1, wherein a difference between external transmittances at wavelengths of 450 nm and 650 nm of the light guide plate is 5% or less.

5. The light guide plate according to claim 1, wherein an uneven structure is formed at a surface of the resin layer.

6. The light guide plate according to claim 1, wherein the resin layer is made of a photocurable resin.

7. A wearable device for AR/MR, the wearable device comprising the light guide plate according to claim 1.

8. The light guide plate according to claim 1, wherein the resin layer has a first surface and a second surface opposite the first surface, the first surface being in contact with the main surface of the glass plate and the second surface having a square-wave shape.

9. The light guide plate according to claim 1, wherein the resin layer comprises a first resin layer and a second resin layer,
the first resin layer is located at a first end of the glass plate and is configured to diffract incident light and pass the diffracted incident light into the glass plate, and
the second resin layer is located at a second end of the glass plate opposite to the first end of the glass plate and configured to further diffract the diffracted incident light exiting from the glass plate.

* * * * *